(12) United States Patent  (10) Patent No.: US 9,047,004 B2
Apted  (45) Date of Patent: Jun. 2, 2015

(54) INTERFACE ELEMENT FOR MANIPULATING DISPLAYED OBJECTS ON A COMPUTER INTERFACE

(75) Inventor: Trent Apted, Kingsford (AU)

(73) Assignee: Smart Internet Technology CRC PTY LTD, Eveleigh NSW (AU)

( * ) Notice: Subject to any disclaimer, the term of this patent is extended or adjusted under 35 U.S.C. 154(b) by 570 days.

(21) Appl. No.: 12/677,756

(22) PCT Filed: Sep. 11, 2008

(86) PCT No.: PCT/AU2008/001342
§ 371 (c)(1),
(2), (4) Date: Jun. 2, 2010

(87) PCT Pub. No.: WO2009/033216
PCT Pub. Date: Mar. 19, 2009

(65) Prior Publication Data
US 2010/0241979 A1    Sep. 23, 2010

(30) Foreign Application Priority Data
Sep. 11, 2007    (AU) ................................. 2007904925

(51) Int. Cl.
*G06F 3/048*    (2013.01)
*G06F 3/0488*   (2013.01)
*G06F 3/0481*   (2013.01)
(Continued)

(52) U.S. Cl.
CPC .......... *G06F 3/04883* (2013.01); *G06F 3/0481* (2013.01); *G06F 3/0486* (2013.01); *G06F 3/04886* (2013.01); *G06F 2203/04806* (2013.01); *G06T 3/40* (2013.01)

(58) Field of Classification Search
USPC ........................................................ 715/765
See application file for complete search history.

(56) References Cited

U.S. PATENT DOCUMENTS 5,016,194 A    5/1991    Matsushita et al.
5,241,625 A    8/1993    Epard
5,341,466 A    8/1994    Perlin
(Continued)

FOREIGN PATENT DOCUMENTS

AU    2003285781    7/2004
AU    2004304946    7/2005
(Continued)

OTHER PUBLICATIONS

Christensen, Brett, "Relocate the Windows Taskbar," May 6, 2006, Available http://web.archive.org/web/20060506163826/http://www.xp-tips.com/relocate-taskbar.html.*

(Continued)

*Primary Examiner* — Alvin Tan
(74) *Attorney, Agent, or Firm* — Workman Nydegger

(57) ABSTRACT

The present invention provides method of manipulating a displayed object capable of interacting with an interface element of a computing interface. The computing interface has a display module for displaying the displayed object in a display area, and which causes the displayed object to interact with the interface element and manipulating the displayed object according to the nature of the input received. The manipulation includes varying the size of the displayed object when the received input results in movement of the displayed object, into, out-of, or through a region of the display area designated as belonging to the interface element.

27 Claims, 2 Drawing Sheets

(51) Int. Cl.
*G06F 3/0486* (2013.01)
*G06T 3/40* (2006.01)

(56) References Cited

U.S. PATENT DOCUMENTS

| | | | |
|---|---|---|---|
| 5,801,699 A * | 9/1998 | Hocker et al. | 715/837 |
| 5,801,700 A | 9/1998 | Ferguson | |
| 5,874,962 A * | 2/1999 | de Judicibus et al. | 715/789 |
| 5,877,762 A | 3/1999 | Young | |
| 5,887,081 A | 3/1999 | Bantum | |
| 5,977,974 A * | 11/1999 | Hatori et al. | 715/839 |
| 6,011,537 A | 1/2000 | Slotznick | |
| 6,133,914 A | 10/2000 | Rogers | |
| 6,408,301 B1 | 6/2002 | Patton | |
| 6,414,672 B2 | 7/2002 | Rekimoto | |
| 6,510,553 B1 | 1/2003 | Hazra | |
| 6,542,192 B2 | 4/2003 | Akiyama | |
| 6,590,593 B1 * | 7/2003 | Robertson et al. | 715/782 |
| 6,727,906 B2 | 4/2004 | Lockeridge | |
| 6,819,267 B1 | 11/2004 | Edmark | |
| 6,880,132 B2 | 4/2005 | Uemura | |
| 6,978,472 B1 * | 12/2005 | Nashida et al. | 725/52 |
| 7,065,716 B1 | 6/2006 | Rzepkowski | |
| 7,102,639 B2 | 9/2006 | Oka | |
| 7,168,813 B2 | 1/2007 | Wong | |
| 7,197,535 B2 | 3/2007 | Salesky | |
| 7,394,459 B2 | 7/2008 | Bathiche | |
| 7,395,515 B2 * | 7/2008 | Konar et al. | 715/858 |
| 7,480,873 B2 | 1/2009 | Kawahara | |
| 7,519,223 B2 | 4/2009 | Dehlin | |
| 7,535,463 B2 | 5/2009 | Wilson | |
| 7,706,634 B2 | 4/2010 | Schmitt | |
| 7,907,128 B2 | 3/2011 | Bathiche | |
| 8,018,579 B1 | 9/2011 | Krah | |
| 8,111,239 B2 | 2/2012 | Pryor | |
| 8,230,359 B2 * | 7/2012 | Robertson et al. | 715/801 |
| 8,677,284 B2 | 3/2014 | Aguilar | |
| 2002/0033849 A1 | 3/2002 | Loppini | |
| 2002/0051063 A1 | 5/2002 | Hwang | |
| 2003/0093466 A1 | 5/2003 | Jarman et al. | |
| 2004/0070608 A1 | 4/2004 | Babatunde | |
| 2004/0150646 A1 | 8/2004 | Oka | |
| 2005/0052427 A1 | 3/2005 | Wu | |
| 2005/0132299 A1 | 6/2005 | Jones et al. | |
| 2005/0140696 A1 | 6/2005 | Buxton | |
| 2005/0280631 A1 | 12/2005 | Wong | |
| 2006/0002315 A1 | 1/2006 | Thuerer | |
| 2006/0010392 A1 | 1/2006 | Noel et al. | |
| 2006/0023078 A1 | 2/2006 | Schmitt | |
| 2006/0031786 A1 | 2/2006 | Hillis | |
| 2006/0125799 A1 | 6/2006 | Hillis et al. | |
| 2006/0136828 A1 | 6/2006 | Asano | |
| 2006/0140508 A1 | 6/2006 | Ohgishi | |
| 2006/0241864 A1 | 10/2006 | Rosenberg | |
| 2006/0253797 A1 | 11/2006 | Madan | |
| 2006/0274046 A1 | 12/2006 | Hillis et al. | |
| 2007/0014460 A1 | 1/2007 | Kuziela et al. | |
| 2007/0046643 A1 | 3/2007 | Hillis et al. | |
| 2007/0146347 A1 | 6/2007 | Rosenberg | |
| 2007/0157101 A1 | 7/2007 | Indiran | |
| 2007/0234226 A1 | 10/2007 | Szeto | |
| 2008/0024444 A1 * | 1/2008 | Abe et al. | 345/157 |
| 2008/0065996 A1 | 3/2008 | Noel et al. | |
| 2008/0222540 A1 | 9/2008 | Schulz | |
| 2008/0229222 A1 * | 9/2008 | Kake | 715/764 |
| 2009/0100343 A1 * | 4/2009 | Lee et al. | 715/733 |
| 2009/0122018 A1 | 5/2009 | Vymenets et al. | |
| 2010/0271398 A1 | 10/2010 | Apted | |
| 2010/0281395 A1 | 11/2010 | Apted | |
| 2010/0295869 A1 | 11/2010 | Apted | |

FOREIGN PATENT DOCUMENTS

| | | |
|---|---|---|
| AU | 2008299577 | 5/2012 |
| AU | 2008299576 | 6/2012 |
| AU | 2008299579 | 6/2012 |
| CA | 2548724 | 7/2005 |
| DE | 10353785 | 6/2005 |
| DE | 102006012976 | 7/2007 |
| EP | 0235902 | 7/1991 |
| EP | 0572228 | 12/1993 |
| EP | 0368664 | 6/1995 |
| EP | 0853426 | 7/1998 |
| EP | 1573678 | 9/2005 |
| EP | 1685384 | 8/2006 |
| EP | 1695195 | 8/2006 |
| EP | 1913574 | 4/2008 |
| EP | 1952221 | 8/2008 |
| EP | 08799989.2 | 10/2011 |
| GB | 2347834 | 9/2000 |
| JP | 62219179 | 9/1987 |
| JP | 2130164 | 5/1990 |
| JP | H11-345060 | 2/1998 |
| JP | 2004-078488 | 8/2002 |
| JP | 2002-140147 | 2/2003 |
| JP | 2004213641 | 7/2004 |
| JP | 2005100391 | 4/2005 |
| JP | 2006-172193 | 6/2006 |
| JP | 2006172193 | 6/2006 |
| JP | 2010-524307 | 9/2008 |
| JP | 2010-524305 | 8/2012 |
| JP | 2010-524306 | 10/2012 |
| WO | WO9306691 | 4/1993 |
| WO | WO2004057540 | 7/2004 |
| WO | WO2005050175 | 6/2005 |
| WO | WO2005060544 | 7/2005 |
| WO | WO2006017695 | 2/2006 |
| WO | WO2007014082 | 2/2007 |
| WO | WO2007061839 | 5/2007 |
| WO | WO2009033217 | 3/2009 |
| WO | WO2009033218 | 3/2009 |
| WO | WO2009033219 | 3/2009 |

OTHER PUBLICATIONS

Otmar Hilliges et al., Photohelix: Browsing, Sorting and Sharing Digital Photo Collections, Horizontal Interactive Human-Computer Systems, Tabletop '07, Second Annual IEEE International Workshop, Oct. 2007, pp. 87-94.

Jingyu Cui et al., Easy Album: An Interactive Photo Annotation System Based on Face Clustering and Re-ranking, Conference on Human Factors in Computing Systems Archive, Proceedings of SIGCHI Conference on Human Factors in Computing Systems, CHI 2007, Apr. 28-May 3, 2007, San Jose, CA, USA.

Techsmith: "Snaglt User's Guide, Capture and Share Anything on Your Screen" Internet Citation 2003, XP 002354973, retrieved from the Internet: URL: ftp://ftp.techsmith.com/Pub/products/snagit/63/snagitug.pdf, retrieved Nov. 18, 2005.

Everitt K et al.: "MultiSpace: Enabling Electronic Document Micromobility in Table-Centric, Multi-Device Environments", Horizontal Interactive Human-Computer Systems, 2006. TableTop 2006. First IEEE International Workshop on Adelaide, South Australia Jan. 5-7, 2006, Piscataway, NJ, USA, IEEE, Jan. 5, 2006, pp. 27-34, ISBN: 978-0-7695-2494-8.

Scott S D et al: "Storage Bins: Mobile Storage for Collaborative Tabletop Displays", IEEE Computer Graphics and Applications, IEEE Service Center, New York, NY, US, vol. 25, No. 4, Jul. 1, 2005 pp. 58-65, ISSN: 0272-1716.

Montferrat, P., Apostolopoulou, A., Besacier, G., Buisine, S., Rey, G., Vernier, F. (2007). Brainstorming and mind-mapping on DiamondTouch: Creativity unleashed. (1 page) (the month of Publication is irrelevant as the year of Publication is clearly prior to the filing of the Application).

Hilliges, Otmar "Designing for Collaborative Creative Problem Solving" Jun. 13-15, 2007, Washington DC, USA (10 pages).

Hilliges, Otmar, Banr, Dominikus, Butz, Andreas "Photohelix:Browsing, Sorting and Sharing Digital Photo Collections" 9 pages, Oct. 2007; Media Informatics Group, University of Munich, Germany.

Office Action for Corresponding Australian Application No. 20085299576 dated Jun. 12, 2012.

(56) References Cited

OTHER PUBLICATIONS

Office Action for Corresponding Japanese Application No. 2010-52305 dated Aug. 28, 2012.
Office Action for Corresponding Australian Application No. 2008299577 dated May 23, 2012.
Office Action for Corresponding Japanese Application No. 2010-524306 dated Oct. 2, 2012.
Meyer, Fernand "An Overview of Morphological Segmentation" *International Journal of Pattern Recognition and Artificial Intelligence*, Nov. 1, 2001 Vo. 15, No. 7, pp. 1089-1118.
Office Actionfor Corresponding European Application 08799989.2 dated Oct. 27, 2011.
U.S. Appl. No. 12/677,760, Feb. 9, 2012, Office Action.
U.S. Appl. No. 12/677,760, Oct. 11, 2012, Final Office Action.
U.S. Appl. No. 12/677,767, Dec. 4, 2012, Office Action.
U.S. Appl. No. 12/677,760, May 24, 2013, Office Action.
U.S. Appl. No. 12/677,765, Apr. 10, 2014, Office Action.
Extended European Search Report from PCT/AU2008/001343 completed Sep. 13, 2013.
International Search Report for PCT/AU2008/001342 dated Nov. 19, 2008.
International Search Report for PCT/AU2008/001345 dated Nov. 21, 2008.
International Search Report for PCT/AU2008/001344 dated Nov. 5, 2008.
International Search Report for PCT/AU2008/001343 dated Oct. 24, 2008.
U.S. Appl. No. 12/677,760, Nov. 27, 2013, Final Office Action.
U.S. Appl. No. 12/677,767, Aug. 27, 2014, Notice of Allowance.
U.S. Appl. No. 12/677,765, Oct. 1, 2014, Notice of Allowance.
U.S. Appl. No. 12/677,760, Nov. 19, 2014, Office Action.
Office Action for Corresponding Japanese Application 2010-524305 dated Sep. 10, 2013.
U.S. Appl. No. 12/677,767, Aug. 5, 2013, Final Office Action.
U.S. Appl. No. 12/677,765, Aug. 29, 2013, Final Office Action.
Extended European Search Report from PCT/AU2008/001344 completed Nov. 8, 2010.
International Search Report cited in International Application No. PCT/AU2010/0008323 dated Aug. 23, 2010.
Office Action for Corresponding Japanese Application 2010-524307 dated Feb. 5, 2013.
Office Action for Corresponding European Application 08799989.2 dated Jan. 7, 2013.
Office Action for Corresponding Australian Application 2008299578 dated Feb. 28, 2013.
Office Action for Corresponding Australian Application 2008299576 dated Mar. 6, 2014.
Office Action for Corresponding European Application 08799988.4 dated Jul. 18, 2012.
U.S. Appl. No. 12/677,767, Mar. 4, 2014, Office Action.
U.S. Appl. No. 12/677,767, Dec. 16, 2014, Notice of Allowance.

\* cited by examiner

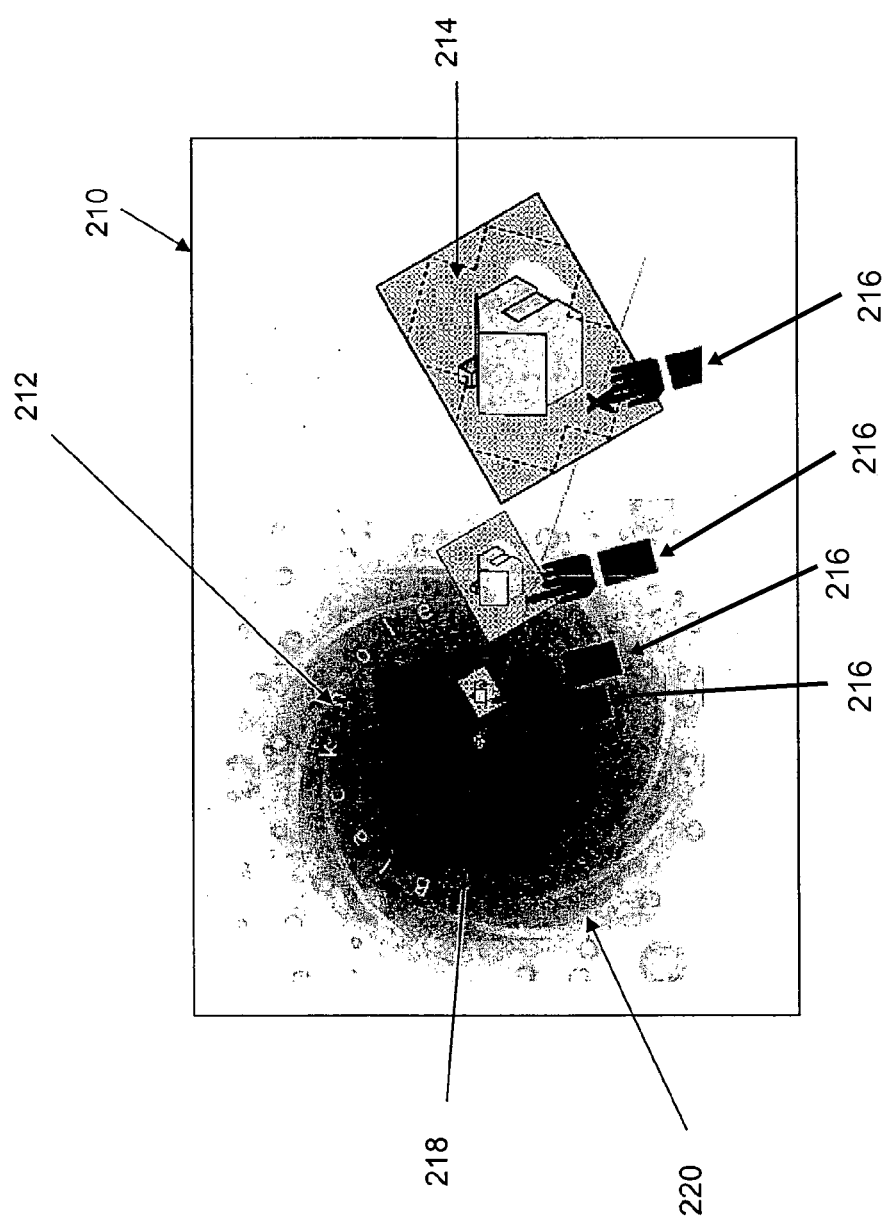

INTERFACE ELEMENT FOR MANIPULATING DISPLAYED OBJECTS ON A COMPUTER INTERFACE

TECHNICAL FIELD

The present invention relates generally to interfaces for computing systems and more particularly, but not exclusively, to a system, method and interface for manipulating objects on a computer interface.

BACKGROUND OF THE INVENTION

Interactive desktop interfaces are known as part of current computer operating systems. In some computing applications it is desirable to have an interactive tabletop interface. An interactive tabletop interface allows for interaction with one or more users on a tabletop display. An interactive tabletop interface facilitates collaborative sharing of objects such as digital photographs by a number of users. Such an interface comprises an image which is projected onto the tabletop display. The image may be projected, for example, by use of an embedded screen or a data projector. One or more users may interact with the displayed image via an input of the interface in order to, for example, manipulate objects in the displayed image. Input to the interface is provided by, for example, a touch sensitive surface, of the tabletop onto which the image is projected. This form of computer interface facilitates so-called "pervasive" computing.

However, when many objects are displayed on a tabletop computer interface, the interface can become cluttered. This can prevent the user from readily interacting with the displayed objects and detract from the user's productivity.

SUMMARY OF THE INVENTION

According to a first aspect of the present invention there is provided a method of manipulating a displayed object capable of interacting with an interface element of a computing interface, the computing interface having a display module for displaying the displayed object in a display area, and an input module for receiving a user input, said method comprising:

receiving a user input which causes the displayed object to interact with the interface element;

manipulating the displayed object according to the nature of the input received, wherein the manipulation comprises varying the of the displayed object with the interface element.

In one embodiment size of the displayed object when the received input results in movement of the displayed object into, out-of, or through a region of the display area designated as belonging to the interface element.

In one embodiment the user input results in movement of the displayed object within the display area in a manner that results in interaction the user input directly moves the displayed object.

In one embodiment the user input causes the displayed object to move into, out-of, or through the region of the interface element.

In one embodiment the user input indirectly results in movement of the displayed object.

In one embodiment the user input causes the region of the interface element to be redefined within the display area which results in interaction of the interface element with the displayed object.

In one embodiment redefining the region of the interface element is in the form of moving the region within the display area.

In one embodiment redefining the region of the interface element is in the form of resizing the region within the display area.

In one embodiment the user input signifies activation of a manipulation property of the interface element which results in interaction of the interface element with the displayed object.

In one embodiment the size of the object is varied according to the direction of movement through the region. Preferably the direction is a radial direction.

In one embodiment the size of the object is reduced as the object is moved towards the centre of the region.

In one embodiment the size of the object is increased as the object is moved away from the centre of the region.

In one embodiment the method comprises manipulating a plurality of displayed objects according to the nature of the input received.

In one embodiment the influence further comprises varying the size of all displayed objects which move into, out-of, or through the region.

In one embodiment the influence further comprises moving all display objects located within the region along with the region when the region is moved.

In one embodiment the influence further comprises moving all display objects located within the region along with the region when the region is moved, unless the region encounters a prohibited zone of the display area, in which case the region is prevented from entering the prohibited zone and the display objects continue to move according to the received input.

In one embodiment the manipulation further comprises causing all displayed objects in the region to move towards the centre of the region when the user input signifies activation of an manipulation property of the interface element.

In one embodiment the manipulation further comprises causing all displayed objects in the display area to move towards the centre of the region when the user input signifies activation of a manipulation property of the interface element.

In one embodiment the manipulation further comprises causing displayed objects having a selected property to move towards the centre of the region when the user input signifies activation of an manipulation property of the interface element.

In one embodiment the manipulation further comprises causing displayed objects that reach the centre of the region to be hidden.

In one embodiment the manipulation is to cause all displayed objects in the region to move away from the centre of the region when the received input signifies activation of a manipulation property of the interface element.

In one embodiment the manipulation is to cause all displayed objects in the display area to move away from the centre of the region when the received input signifies activation of a manipulation property of the interface element.

In one embodiment the manipulation further comprises causing displayed objects having a selected property to move away from the centre of the region when the received input signifies activation of a manipulation property of the interface element.

In one embodiment the manipulation further comprises causing displayed objects within the region to be deleted when the received input signifies activation of a manipulation property of the interface element.

In one embodiment the influence further comprises causing displayed objects within the region to be resized when the received input signifies resizing of the interface element. Preferably the resizing of the objects is of the same type and/or proportion as the resizing of the interface element. In an embodiment the resizing of the object is in proportion to the size of the region of the interface element.

In one embodiment the manipulation further comprises causing hidden displayed objects within the region to be shown when the received input signifies activation of a manipulation property of the interface element.

In one embodiment a representation of the interface element is displayed within the region. In one embodiment the representation is of a black hole.

According to a second aspect of the present invention there is provided a computer readable storage medium storing a computer program for manipulation a displayed object in a display area that interacts with an interface element of a computing interface, said computer program comprising instructions that when executed by a computer cause the computer to:
  receive a user input which causes the displayed object to interact with the interface element;
  manipulating the displayed object according to the nature of the input received, wherein the manipulation comprises varying the size of the displayed object when the received input results in movement of the displayed object into, out-of, or through a region of the display area designated as belonging to the interface element.

According to a third aspect of the present invention there is provided an apparatus for manipulation a displayed object that interacts with an interface element of a computing interface, said apparatus comprising:
  a display having a display area;
  an user input;
  a processor configured to:
  receive a user input which causes the displayed object to interact with the interface element;
  manipulating the displayed object according to the nature of the input received, wherein the manipulation comprises varying the size of the displayed object when the received input results in movement of the displayed object into, out-of, or through a region of the display area designated as belonging to the interface element.

According to a fourth aspect of the present invention there is provided an apparatus for manipulating displayed objects that interacts with an interface element of a computing interface, said apparatus comprising:
  a display having a display area;
  an user input;
  means for receiving a user input which causes the displayed object to interact with the interface element;
  means for manipulating the displayed object according to the nature of the input received, wherein the manipulation comprises varying the size of the displayed object when the received input results in movement of the displayed object into, out-of, or through a region of the display area designated as belonging to the interface element.

According to a fifth aspect of the present invention there is provided an interface element for a computing interface having a display module for creating a display covering a display area and an input module for receiving a user input, said element comprising:
  an interface element interaction module for designating certain user input that causes the displayed object to interact with the interface element as interface element input;
  an object manipulation module for manipulating objects in the display according to the nature of the input received when an interface element input is received, wherein the manipulation module is configured to vary the size of displayed objects that the input signifies as moving a displayed object into, out-of or through the region.

BRIEF DESCRIPTION OF THE DRAWINGS

In order to provide a better understanding of the present invention, preferred embodiments will now be described, by way of example only, with reference to the accompanying drawings, in which:

FIG. 2 is a screen shot of an interface displaying the interface element, according to an embodiment the present invention.

DETAILED DESCRIPTION

Figure 1:
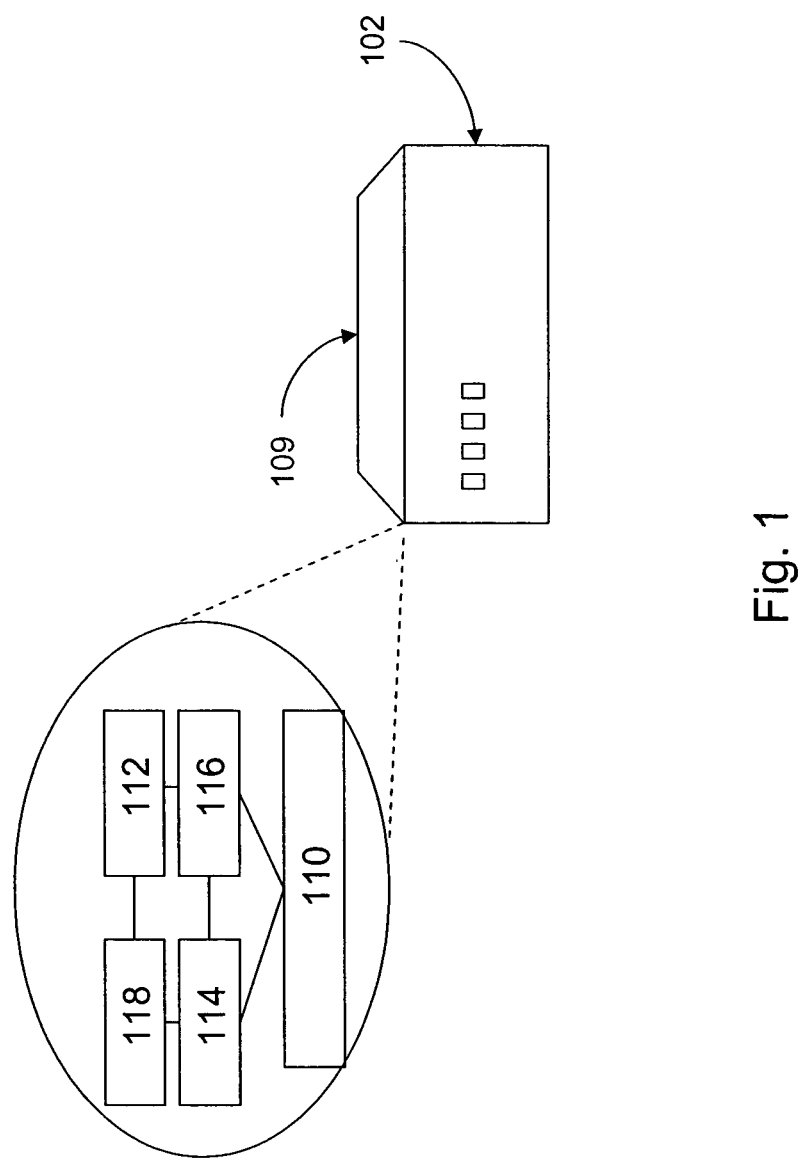
FIG. 1 is a schematic of a computing system arranged to provide an interface element in accordance with an embodiment of the present invention.

An aspect of the present invention provides a new interface element for reducing screen clutter on a computer interface. In the embodiment described herein, the computer interface is displayed on a surface-mount display provided by a tabletop computing system. The interface element operates to manipulate or influence objects displayed on the interface based on a user input. In an embodiment, manipulating the object comprises varying the size of the displayed object when the received input results in the object being moved into, out of, or through a region of the display associated with the interface element. For example, where a user of the tabletop computer wants to focus their attention on one of ten objects (e.g. a digital photograph) presently displayed on the user interface, they may drag any one or more of the other nine objects towards the interface element to effectively minimize their size.

To carry out the aforementioned functionality and with reference to FIG. 1, the tabletop computer 102 comprises computer hardware including a motherboard 110, central processing unit 112, random access memory 114, hard disk 116 and networking hardware 118. The tabletop computer 102 also includes a display 109 in the form of a projector which projects an image (i.e. the user interface) onto a tabletop surface. The tabletop computer 102 also includes an input module for receiving a user input from an input device. Using the input device, users of the tabletop computer manipulate objects displayed on the user interface.

In addition to the hardware, the tabletop computer 102 includes an operating system (such as the Microsoft Windows™ XP operating system, which is produced and licensed by Microsoft Corporation) that resides on the hard disk and which co-operates with the hardware to provide an environment in which the software applications can be executed. In this regard, the hard disk 116 of the tabletop computer 102 is loaded with a display module for controlling a video output device which displays the user interface.

In the embodiment described herein, the objects are in the form of digital photographs, but it will be appreciated that other objects, such as text files, or computer generated graphical images could equally be displayed and manipulated. In an embodiment, input to the interface is provided by a touch sensitive surface of the tabletop onto which the image is projected.

In the embodiment described herein, the objects are in the form of digital images displayable on the tabletop. The images may colloquially be referred to as "photographs". The photographs are displayed as rectangular objects within the display area. Photographs can be moved across the tabletop by mimicking a "dragging" motion with a pointer, such as a finger, pen, stylus or cursor. The touch of the pointer is received by the input device and interpreted as an input. The photographs can be manipulated in other ways, such as, for example, moving, rotating and resizing, depending on the input.

If many photographs are displayed, the display area can become cluttered. This can detract from the productivity of the user. The embodiment therefore provides an interface element which can 'hold' objects not currently required by the user. The held objects are resized to assist in reducing clutter. Furthermore one embodiment of the invention allows the interface element to temporarily remove photographs from the display area. In a further embodiment they can be permanently deleted.

Referring to FIG. 2, there is shown a screen shot of a tabletop computer user interface 210 displaying the interface element 212, pictorially represented and hereafter referred to as a black hole. The black hole is typically circular in shape, as such a shape is instantly recognisable to a user. However, it will be understood that the black hole may take any suitable form. The black hole 212 forms part of the interface. The black hole 212 has a region of influence, which is part of the user interface 210. Objects 214 (such as the photographs) that enter into the region of influence or move within the region are affected by influence characteristics of the black hole 212. The black hole 212 comprises a centre portion 218 and a periphery 220, which divide up the region of influence. In one embodiment the centre portion has one type of influence and the periphery has another type of influence on objects in the region, depending on whether the object is in (or touches) the centre portion or is in (or touches) the periphery (without touching the centre portion).

Objects 214 moving in the periphery 220 automatically have their size changed according to whether the user input moves them towards or away from the centre of the black hole. The resizing is immediate and in proportion to the movement in order to give real-time feedback to the user input which cause the object to be moved. In particular when the object moves towards the centre it is reduced in size and when it moves away from the centre it is enlarged. This continuous feedback gives the appearance of the photograph being "sucked into" the black hole, or "spat out" of the black hole, depending on the direction of movement.

In an embodiment the centre portion hides objects moved within it. In another embodiment, objects that touch the centre portion are deleted from the display. The centre portion may be the geometric centre point of the black hole, or it may be a (small) central area.

FIG. 2 schematically shows use of the black hole 212 in which a photograph 214 has been selected as indicated by finger shaped cursor pointer 216 and is being moved towards the centre of black hole 212. The black hole affects the displayed size of the object by reducing the size of the photograph as it moves towards the centre of hole. This assists in controlling clutter of the tabletop interface 210, as photographs that are currently not being used can be moved out of the way or deleted.

The interface displays objects by maintaining in memory the position of the objects, their scale and their orientation within the display. The display is repeatedly redrawn using a graphics API, such as OpenGL. Each time the display is redrawn, OpenGL draws a texture for that object, as well as decorations, at the correct position and orientation. When interaction occurs, the interface determines which object was selected, and where on the object the selection occurred.

The interface then determines in what way the input manipulates the selected object. This includes determining whether and how the input causes the selected object to be moved. The interface element determines whether the movement of the object causes it to be affected by the black hole. See Appendix A as an example of instructions (in the form of C++ code) for implementing this. Alternatively if the black hole is selected the interface element determines whether the manipulation of the black hole affects other objects.

In FIG. 2 it can be seen that the user has touched the tabletop or screen (or used a cursor directed by a mouse, track ball or other input device) over the object 214 and has dragged the object into the region of influence of the black hole. The finger pointer 216 moves closer to the centre of the black hole, rather than the centre of the object moving closer. The centre of the object just travels with the movement of the pointer. The black hole has recognised that the input has caused the object to move within this region of influence and has caused the object to be diminished in size as it moves. If it reaches the centre portion the photograph becomes hidden. See for example Appendix B below.

Photographs that are placed in the periphery of the black hole can be recovered by simply selecting them and dragging them out. This will cause them to be enlarged back to the size before they were influenced by the black hole.

If the back hole is resized the photographs within the region of influence change their size inverse proportionally. In one embodiment this is due to the scaled size of the object in the region of influence being shrunk in proportion to the size of the black hole, thus as the black hole is reduced in size its shrinking effect on the object diminishes. Thus another method to remove photographs from the black hole is to reduce the black hole size, such that photographs within the black hole grow in size and can be selected and dragged out from the region of influence of the black hole.

Objects that are placed in the region of influence of the black hole become attached. In other words, if the black hole is moved, then the objects move with the black hole.

Algorithms are employed to determine layering of photographs around the black hole. One algorithm keeps objects in the black hole as it is moved and another algorithm determines the size of objects within the region of influence based on the size of the image, the size of the black hole and the Euclidean distance between the centres of the each image and the black hole.

Another way of removing objects from the black hole is for the user to attempt to move the black hole into a zone of the display area in which the black hole is prohibited from entering, such as a personal space. Even though the black hole cannot be moved into the personal space, the objects stuck to the black hole can enter the space and will be dragged out as the user continues to move the pen/stylus etc. Thus the black hole gets stuck on the border of personal space, while the photographs are moved into the personal space.

When the user holds a selected position on the black hole, this can activate one or more manipulations of black hole. In one embodiment the manipulation characteristic causes all the objects in the region of influence to be permanently deleted. In a further embodiment, the manipulation characteristic may also cause other images on the tabletop to move continuously towards black hole providing an appearance of "gravity". One such other manipulation characteristic is to have images within a black hole move radially and other images on the tabletop to move away from the black hole, providing an appearance of "anti-gravity". Another is for the gravity to only affect objects with specifics characteristics.

Various other manipulation characteristics will be readily apparent to the person skilled in the field invention. Such manipulation characteristics provide the user with intuitive feedback.

In some embodiments the continuous movement occurs at a constant velocity. In another embodiment the continuous movement accelerates, while the input is active. The objects may then be given "virtual momentum" and subjected to "virtual friction" as described below in relation to "flicking". In an embodiment the continuous movement is along a tangent to the central region of the black hole. In an embodiment the velocity of the movement for each object is proportional to the inverse of the distance between the centre points of the black hole and the object.

Objects on the tabletop may be subjected to "flicking". Flicking provides an object with an associated momentum, which is counteracted by a virtual frictional force. (Flicking is described in: Margaret R. Minsky. Manipulating simulated objects with real-world gestures using a force and position sensitive screen. *SIGGRAPH Computer Graphics*, 18 (3): 195-203, 1984. ISSN 0097-8930. doi: http://doi.acm.org/10.1145/964965.808598 which is incorporated herein by reference).

When an image is flicked in the direction of a black hole and it encounters the region of influence, a virtual gravitational force can be simulated, which causes the object to accelerate towards the centre portion of the black hole. The algorithm employed maintains the momentum of the object and applies acceleration towards the centre of the black hole. The algorithm can closely model the physics of gravity to maintain a realistic feedback to the actions of the user. Thus, the object does not simply disappear, but rather, as the object hits the black hole, it will spiral inwards towards the centre of the black hole.

It is possible for the object to remain in an ongoing orbit. However, the algorithm can have a term included, such that when the component-wise change in velocity is in the opposite direction to the velocity, the acceleration towards the centre is increased. This causes the path of objects to favour spiralling in towards the centre of the black hole, even where the object was not intently aimed directly towards the centre. As an object encounters the centre portion it is captured and hidden. Thus an image can be flicked generally towards the black hole, and it will be sucked into the black hole even if the aim is not entirely accurate. In other words, the object need not be directed to the central region as long as it encounters the region of influence it will be drawn in. This can allow a user to delete an object even if the back hole is not within reach. See for example Appendix C & D.

If the flick of the object is too hard and the object has sufficient momentum, the object will pass the black hole without being drawn into the black hole. This can result in a gravitational slingshot effect. However, further modifications can be made to the algorithm to prevent sling-shotting.

In one embodiment black holes are prevented from being flicked. That is, they will not gain momentum, even though the object can be moved across the tabletop. Once the black hole is released, it will simply stop where it was released. However, objects within the black hole can maintain momentum. Therefore, when the black hole stops, objects within it can keep moving by virtue of their momentum and with thus fall out of the black hole. Alternatively objects within the black hole can maintain stationary inertia and thus when the black hole is moved too quickly the objects tend to move less quickly and will fall out of the black hole.

For each on-screen object (including the black hole object) the following is maintained:
  (x, y, z) position of the centre of the object, in "world" coordinates (z determines the order objects may be drawn)
  (x, y) position of the touch point, in "object" coordinates, if an object is being moved
    "object" coordinates extend from [−aspect, −0.5] to [aspect, 0.5] on each object
  s, the desired scale of an object, changeable by performing a rotate/resize operation on the object
  userLock, the identifier of the user moving an object or "NO_USER"

For objects other than the black hole, the following is calculated on each screen redraw:
  bhd, the most recently determined "distance" from the black hole, calculated as $$bhd = \frac{d\sqrt{2}}{s},$$

where d is the square of the Euclidean distance between the centre of the black hole and the object and s is the current scale of the black hole;
    An object is said to be in central portion of the black hole when bhd<1.0
    The periphery of the black hole is the circular area around the black hole where bhd<1.0

For objects other than the black hole, the following calculations are made:
  residual, an indication of whether an object has been moved into and subsequently released in the periphery of the black hole, and the value of bhd when that occurred (residual_bhd)
    if an object enters the periphery of a black hole other than by a move (or if the black hole itself was moved such that its periphery encompasses the centre of an object) then its residual_bhd is 1.0

When an object is in central portion of the black hole, the displayed scale is altered (after processing the desired scale) as follows:
  the displayed scale is reduced by a factor of bhd×residual_bhd
  in addition, if the object is currently being moved (i.e. it is being touched), the "centre" of the scale operation is not the centre of the object (i.e. the point (0,0) in object coordinates), but is instead the touch point, so that when the object is rescaled, the object coordinates of the touch point remain unchanged There is a transformation from world coordinates to screen coordinates in order to display an object.

Two notions of layering are used to determine the final draw order of objects—z-coordinate and layer. Objects drawn last will be shown occluding any objects below it, unless parts of the object are partially or wholly transparent. The black hole, for example, is transparent around its edges, opaque in the centre, with a transparency gradient between. The z coordinate of the object determines the final draw order (objects are drawn in order of decreasing z coordinate).

Whenever an object is selected, it is given the lowest z coordinate of any object in the same layer, thus it appears on top of those objects. Special objects, such as the black hole, are given a higher layer. Thus, the black hole is always shown on top of other objects and it is never obscured.

Objects can be flipped over; as if they were physical photographs placed on the table. In the touch interface, this was accomplished by for example placing two fingers on the image, one each in adjacent photo corners, and then dragging the fingers across the image to flip it. Alternative flipping techniques can also be employed, such as selecting a "hot spot" (for example triangles superimposed on the corner of each object) and dragging it over the rest of the image.

The technique for flipping an object is shown in Appendix E to H. They take as arguments the (x, y) pixel coordinate on screen that is the current "control point" used for the flip, e.g. the location of the stylus or finger. The first step is to convert this to object coordinates using the cached inverse transformation matrices used to position the object being flipped in the virtual environment (but before any flipping rotation transformation took place in the draw procedure). The x coordinate is normalised to make it comparable with the y coordinate (i.e. they are given equal weighting to determine the initial direction to flip).

If the flip has not already begun, the direction (xflip) is determined as the direction with the larger component (i.e. most distant from the centre of the image). And it is a "reverse" flip if we are to the left of centre for a horizontal flip, or below centre for a vertical flip. The distance to flip (dist) is twice the position component (as points initially extend from ~0.5 to 0.5), so dist lies in the range [~1.0, 1.0]. The angle to flip is the arccosine of the dist. We maintain state to continue a flip in the "same" direction once initiated, and to determine whether we are flipping to the reverse side, or back to the "front" side. The flipping of the image itself occurs in the draw procedure.

If the object flipped is the black hole the hidden contents of the black hole can be displayed. This allows the user to select and drag objects out of the black hole.

The flipping technique described above is the subject of a related Australian provisional patent application entitled "A System and Method for Manipulating Digital Images on a Computer Display" filed in the name of Smart Internet Technology CRC Pty Ltd, and accorded provisional filing number AU2007 904927, which is incorporated herein by reference.

EXAMPLE

Consider the following scenario: a user plugs their digital camera into a computer loaded with an interface in accordance with an embodiment of the present invention. It holds a large number of photos taken from a recent holiday, so an object containing thumbnails for the photos is loaded. Sometimes, the thumbnail is insufficient quality to judge whether an image is the one desired to discuss, or to decide between two closely related photos. Dragging a thumbnail off the object causes a higher-quality copy of the thumbnail to be created. However, the user decides that they no longer need this copy, so they wish to delete it.

On a traditional computing interface, the user might drag the icon to a "Trash Can" or "Recycle Bin", but in a virtual environment, this has a number of problems. The "trash" is usually located at a fixed position on the display. On a physically large virtual interface, a user might not be able to reach the location of the object, and so they may wish to flick the object in the direction of the trash; alternatively they may wish to move the trash object around the environment. There may be multiple users and the "trash" may only be oriented or easily accessible by a single user. Opening the trash to retrieve something is impractical on a tabletop computing system, particularly where an interface is designed to be intuitive to users not familiar with standard computer conventions. Offering a confirmation dialogue to confirm deletion, or a context menu to move an item to trash is also impractical. The trash may be obscured and an inexperienced user may inadvertently move an item over the trash, accidentally deleting it. An object may be displayed on a screen much larger than the "trash" object, and without a mouse cursor, it might not be clear how to indicate that something should be moved to the trash. The user may also wish to partially hide the image without deleting the image.

To delete a photograph/image (i.e. an object) using the black hole, the user drags the object (e.g. with a finger or stylus) towards the black hole. Once the user's finger (i.e. not the centre of the image; regardless of where it was touched) is within the influence of the black hole (bhd<1.0) the object begins to reduce in size. As the user's finger gets closer to the centre of the black hole, the object gets smaller, until it can no longer be seen at the centre of the black hole. Alternatively, if the user notices the reduction in size, and decides they do not actually want to delete/hide the object, they can take it back out immediately.

The user may also wish to move the black hole. They do this simply by dragging it—the black hole and all its contents (including items on its periphery or fringes, which may still be visible) are moved to the new location, maintaining their relative positions. As the black hole moves, objects which come near the black hole are affected, if their centres enter the fringe. If the black hole is then released, the objects influenced by the black hole are "captured" by the black hole, allowing the black hole to be used in a manner akin to a vacuum cleaner on the virtual environment.

After being released into the black hole, objects can be retrieved. Techniques for this vary, depending on the distance "into" the Black hole the image is placed. If the object is on the fringe of the black hole, the object may be able to be moved out, provided some of the object "pokes out" from underneath the black hole. If no part of the object sticks out, the black hole may be made smaller, decreasing its effect on the object (i.e. as the black hole scale, s, is reduced, bhd becomes larger). When the object on the fringe becomes larger, and can then be moved away. However, a limit may be imposed on how small the black hole can be made. If an object is very near the black hole centre, it can be retrieved by moving the black hole to a "dumping ground" such as a personal space, where the black hole is not allowed to travel. Alternatively, repeatedly flicking the black hole can cause the images within the black hole to be left behind.

Although not required, the embodiments described with reference to the Figures can be implemented via an application programming interface (API) or as a series of libraries, for use by a developer, and can be included within another software application, such as a terminal or personal computer operating system or a portable computing device operating system. Generally, as program modules include routines, programs, objects, components, and data files that perform or assist in the performance of particular functions, it will be understood that the functionality of the software application may be distributed across a number of routines, objects and components to achieve the same functionality as the embodiment and the broader invention claimed herein. Such variations and modifications are within the purview of those skilled in the art.

It will be understood to persons skilled in the art of the invention that many modifications may be made without departing from the spirit and scope of the invention.

APPENDIX A

```
[language={C++}]
EFFECT 1 - Procedure on each screen redraw to determine
whether each object is affected by the black hole
bool Resource::blackHoled( ) {
    double dx = env->blackhole->position.x;
    double dy = env->blackhole->position.y;
    if (bh_moving
            || (worldMPos.x == 0.0 && worldMPos.y == 0.0)
            || userLock == NO_USER) {
        dx -= position.x;
        dy -= position.y;
    } else {
        dx -= worldMPos.x;
        dy -= worldMPos.y;
    }
    double old_bhd = blackhole_distsq;
    bool oldinBH = inBlackhole;
    blackhole_distsq = M_SQRT2*(dx*dx + dy*dy) /
        env->blackhole->scale;
    inBlackhole = blackhole_distsq < 1.0;
    wasInBlackhole = wasInBlackhole || inBlackhole;
    if ((inBlackhole && old_bhd != blackhole_distsq) ||
            inBlackhole != oldinBH) {
        pc.makeDirty( ); //if it's not already dirty BH probably moved
    }
    if (residual) {
        //we don't actually want the effective blackhole_distsq to
        change
        residual_bh_distsq = old_bhd / blackhole_distsq;
        residual = false;
    }
    if (!inBlackhole) {
        //we reset this as soon as we get taken out of the blackhole
        residual_bh_distsq = 1.0;
    }
    return
        (bh_trapped && blackhole_distsq <
        RConfig::MIN_SCALE_FOR_DRAW)   ||
        (link && link->getParent( )->isInBlackhole( ));
}
```

APPENDIX B

```
Procedure to determine what size to display an
object affected by the black hole
void Resource::wormHole( ) {
    inBlackhole = blackhole_distsq < 1.0;
    if (inBlackhole) {
        if (!bh_moving && (userLock != NO_USER || bh_trapped)) {
            //scale at the mouse cursor to keep its reltive position
            glTranslatef(currMPos.x, currMPos.y, 0);
        }
        glScalef(blackhole_distsq*residual_bh_distsq,    // x-scale
                 blackhole_distsq*residual_bh_distsq,    // y-scale
                 1.0);                                   // z-scale
        if (!bh_moving && (userLock != NO_USER ||
        bh_trapped)) {
            glTranslatef(-currMPos.x, -currMPos.y, 0);
        }
    }
    if (!inBlackhole && bh_trapped) {
        bh_trapped = false;
        userLock = NO_USER;
    }
}
```

APPENDIX C

```
Position update procedure for momentum when near
the black hole
/**
 *
 *\return true if the Animation has finished
 */
bool Momentum::rel_update(unsigned ms)
{
    // use \f$ s = ut + \frac{1}{2}at^2 \f$ -- classic physics formula for
    // displacement given initial velocity and acceleration over time
    float dt = 0.001*(ms - lastms);
    lastms = ms;
    if (r->selectedBy( ) != user) {
        // if someone else touched it, we stop
        if (r->selectedBy( ) >= 0)
            return true;
        // if we were just deselected, we still want border colour
        // and access restrictions, and a deselect when we stop
        killselect = true;
    }
    // see if we've been touched again by the same user, if so, stop
    if (r->clickPos != clickPos)
        return true;
    // DEcelleration due to friction/drag is directed against the x/y
    // components of _velocity_. Magnitude is just decel --
    // the (constant) decelleration due to friction/drag
    float vtheta = xv == 0.0 ? M_PI/2.0 : atanf(fabs(yv / xv));
    float accel_x = (xv < 0 ? 1.0 : -1.0) * cosf(vtheta) * decel;
    float accel_y = (yv < 0 ? 1.0 : -1.0) * sinf(vtheta) * decel;
    // change the accelleration vector if we're near the black hole
    // by adding a component directed towards the centre of the blackhole
    // of magnitude BLACKHOLE_ACCEL
    if (r->blackholeDist( ) < 1.0) {
        /* note we use screen positions before the blackhole warping */
        float dx = r->env->blackhole->getPC( ).getScreen( ).x
                 - r->getPC( ).getScreen( ).x;
        float dy = r->env->blackhole->getPC( ).getScreen( ).y
                 - r->getPC( ).getScreen( ).y;
        float theta = dx == 0.0 ? M_PI/2.0 : atanf(fabs(dy / dx));
        accel_x += (dx < 0 ? -1.0 : 1.0)
                 * RConfig::BLACKHOLE_ACCEL
                 * cosf(theta)
                 * (dx * xv < 0.0 ? 1.5 : 1.0);
        accel_y += (dy < 0 ? 1.0 : -1.0)
                 * RConfig::BLACKHOLE_ACCEL
                 * sinf(theta)
                 * (dy * yv > 0.0 ? 1.5 : 1.0);
    }
    // update velocity and displacement from the acceleration vector
    float xvdiff = accel_x * dt;
    float yvdiff = accel_y * dt;
    float xdiff = xv * dt + 0.5 * accel_x * dt * dt;
    float ydiff = yv * dt + 0.5 * accel_y * dt * dt;
    xv = (fabs(xvdiff) >= fabs(xv) && r->blackholeDist( ) >= 1.0) ?
            0 :
            xv + xvdiff;
    yv = (fabs(yvdiff) >= fabs(yv) && r->blackholeDist( ) >= 1.0) ?
            0 :
            yv + yvdiff;
    if (!finite(xv) || !finite(yv)) {
        xv = yv = 0.0f;
    }
    // stop when less than 10 pixels / second -- why 10? => ~frame
    // redraw also stop when we're "trapped" by the centre of the
    Blackhole
    if (r->blackholeDist( ) < RConfig::BLACKHOLE_TRAPDIST ||
            (r->blackholeDist( ) >= 1.0 && fabs(xv) <= 20 &&
            fabs(yv) <= 20)) {
        if (killselect)
            r->unSelect(user);
        if (r->blackholeDist( ) >= 1.0)
            r->settle( );
        return true;
    }
    // remember our desired position
    x0 = x0 + xdiff;
    y0 = y0 + ydiff;
    // then move to the closest screen/pixel location, restricting to bounds
    r->moveto(static_cast < int >(roundf(x0)),
              static_cast < int >(roundf(y0)));
    if (r->getPC( ).getRealScreen( ).x + 3 >= r->env->getSurface( )->w
            && RConfig::DATAWALL_SEND && !sent) {
        // trigger send at right side of screen
        sent = true;
        datawall_send(r);
    } else if (r->getPC( ).getRealScreen( ).x <= 3
            && RConfig::MAGICMIRROR_SEND && !sent) {
```

APPENDIX C-continued

```
        // trigger send at left side of screen
        sent = true;
        datawall_send(r, true);
    }
    return false;
}
```

APPENDIX D

Procedures controlling the triggering
of a momentum animation
```
void Mover::updatePositions( ) {
    if (positions.size( ) == RConfig::VELOCITY_WINDOW)
        positions.pop_back( );
    positions.push_front(std::make_pair(current_time,
    current_xy_position));
}
MoveTracker* Mover::release( ) {
    if   (!RConfig::DO_MOMENTUM
            || positions.size( ) < RConfig::VELOCITY_WINDOW
            || r->hasLink( ))
        return ResourceGesture::release( );
    float dx = positions.front( ).second.x – positions.back( ).second.x;
    float dy = positions.front( ).second.y – positions.back( ).second.y;
    float dt = (positions.front( ).first – positions.back( ).first) / 1000.0f;
    float vel_sq = (dx * dx + dy * dy) / (dt * dt);
    if (vel_sq > RConfig::ESCAPE_VELOCITY && r
    != r->env->blackhole) {
        r->env->addAnimation(new Momentum(r,
                                dx / dt, dy / dt,
                                positions.front( ).second.x,
                                positions.front( ).second.y));
    }
    return ResourceGesture::release( );
}
```

APPENDIX E

Procedure for deciding whether to initiate
a flip
```
bool Image::flipSelected( ) {
    GLfloat x = fabsf(currMPos.x), y = fabsf(currMPos.y);
    return !inBlackhole &&
        (y – x > RConfig::CORNER_PROP ||
        x – y > 0.5*aspect – 0.5 + RConfig::CORNER_PROP);
}
```

APPENDIX F

Procedures for flipping an object, given the current
contact position on the screen
```
bool Image::flipto(int screen_x, int screen_y) {
    P3<GLfloat> avgPos;
    //determine in texture coords where the control point is
    setObject(avgPos, screen_x, screen_y, true);
    avgPos.x /= aspect; //normalise between 0 and 1
    //(we always flip along the bigger direction)
    float cosval, dist;
    if (!flipping) { //not already flipping
        xflip = fabs(avgPos.y) > fabs(avgPos.x);
        dist = xflip ? avgPos.y*2.0 : avgPos.x*2.0;
        backflip = dist < 0;
        wasflipped = flipped;
        flipping = true;
    } else {
        dist = xflip ? avgPos.y*2.0 : avgPos.x*2.0;
    }
    //now the flipping state toggles if the distance has changed in sign
    flipped = wasflipped != (backflip != dist < 0);
    //determine the angle to rotate the image
    cosval = fabs(dist);
    if (cosval < 1.0) {
        flipangle = acosf(cosval); //between 0 and 90
```

APPENDIX F-continued

```
        //now, if we started on the "wrong" side, we rotate the other way
        //we also do a magical flip at the centre if flipped
        if (xflip == backflip)
            flipangle *= –1.0;
        //now we are here, whenever we have a change from
        // the start, we want to subtract from 180 degrees
        if (flipped != wasflipped)
            flipangle = –flipangle;
    } else {
        //dist is > 1.0, so touch point moved away -- don't flip
        flipangle = 0.0;
    }
    pc.makeDirty( );
    return true;
}
void Image::drawPartialFlip( ) {
    glPushMatrix( );
    glRotatef(flipangle*RAD2DEG,
                xflip ? 1.0 : 0.0,
                xflip ? 0.0 : 1.0,
                0.0);
    if (flipped) {
        drawReverse( );
        //also draw the back if we are flipping
        if (flipping) {
            glRotatef(180,
                    xflip ? 1.0 : 0.0,
                    xflip ? 0.0 : 1.0,
                    0.0);
            glCallList(*model);
        }
    } else {
        drawTexture( );
        if (flipping) {
            glRotatef(180,
                    xflip ? 1.0 : 0.0,
                    xflip ? 0.0 : 1.0,
                    0.0);
            drawReverse( ); /* if rendering ?? */
        }
    }
    glPopMatrix( );
}
```

APPENDIX G

Procedure for changing the aspect ratio
of the Frame, using the flip widgets
```
bool SmartFrame::flipto(int x, int y) {
    GLint realy = flip(y);
    P3<GLfloat> avgPos;
    setWorld(avgPos, x, realy, true);
    //find out which way the aspect should be changed
    if (!flipping) {
        xflip = fabs(avgPos.y) > fabs(avgPos.x);
        wasflipped = flipped;
        flipping = true;
    }
    double dx = pc.getScreen( ).x – x;
    double dy = pc.getScreen( ).y – realy;
    if (fabs(dx) <= 1 && fabs(dy) <= 1)
        return false;
    double delta = sqrt(dx*dx + dy*dy);
    if (xflip) {
        //if xflip, aspect in centre is inf, and we need to change the scale
        changeAspect(1.0 / (delta / (clickPosLine / (1.0 / clickAspect))));
        setScale(delta / clickPosLine / clickScale), false, false);
    } else {
        changeAspect(delta / (clickPosLine / clickAspect));
    }
    pc.makeDirty( );
    return true;
}
```

APPENDIX H

```
Procedure for performing a "flow" layout
of attachments on the back of a flipped object
void FlowLayout::doFlowLayout(Layout::COLL &col) {
    const double pad = padding * parent->getScale( );
    const double mar = margin * parent->getScale( ) - pad; //can go
negative
    const double maxw = parent->estWidth( ) - 2*mar;
    const double maxh = parent->estHeight( ) - 2*mar;
    double y = -(maxh * -0.5 + pad + mar);
    COLL::iterator it = col.begin( );
    const COLL::iterator end = col.end( );
    const double rads = parent->getRads( );
    while (it != end) {
        COLL row;
        double h = (*it)->estHeight( );
        double w = (*it)->estWidth( ) + pad;
        row.push_back(*it++); // put at least one element in the row
        for (; it != end; ++it) {
            // fill the row
            if (w + pad + (*it)->estWidth( ) > maxw)
                break;
            w += pad + (*it)->estWidth( );
            // check if the row height must be increased
            if ((*it)->estHeight( ) > h)
                h = (*it)->estHeight( );
            row.push_back(*it);
        }
        COLL::iterator rit = row.begin( );
        const COLL::iterator rend = row.end( );
        double x = maxw * -0.5 + pad + mar;
        y += -(h * 0.5);
        // now adjust the positions of the objects
        for (; rit != rend; ++rit) {
            x += (*rit)->estWidth( ) * 0.5;
            if (!(*rit)->isManip( )) {
                // only move things not being manipulated
                P3<GLfloat> oldPosition((*rit)->getPosition( ));
                GLfloat oldRot = (*rit)->getRads( );
                (*rit)->rotaterad(rads);
                (*rit)->stealPosition( ).set(x*cos(-rads) -
                            y*sin(-rads), x*sin(-rads) + y*cos(-rads),
                            (parent->isFlipped( ) ?
                            0.0001f :
                            -0.0001f));
                (*rit)->stealPosition( ) += parent->getPosition( );
                if (lastSettled == rit->addr( )) {
                    // if we were the last thing added,
                    animate the movement
                    (*rit)->env->addAnimation(new LinearPath(*rit,
oldPosition, (*rit) ->getPosition( ), 200), Animation::REPLACE);
                    (*rit)->env-
>addAnimation(new LinearSpin(*rit, oldRot, rads, 200),
Animation::REPLACE);
                    lastSettled = 0;
                }
            }
            x += (*rit)->estWidth( ) * 0.5 + pad;
        }
        y += -(h * 0.5 + pad);
    }
    lastAdded = 0;
}
```

The invention claimed is:

1. A method of manipulating a displayed object capable of interacting with an interface element of a computing interface, the computing interface having a display module for displaying the displayed object in a display area, and an input module for receiving user input, said method comprising:

displaying the interface element that defines a region of influence within the display area of the computing interface, the interface element altering the size of displayed objects within the region of influence based on proximity of the objects to a designated centre of the region of influence, receiving a user input which causes the interface element to move within the display area and alter the position of the centre of the region of influence relative to the displayed object; and manipulating the size of the displayed object when the received input results in an overlap between the region of influence and the displayed object, wherein the manipulation further comprises moving all displayed objects located within the region of influence along with the region of influence when the interface element is moved, unless the region of influence encounters a prohibited zone of the display area, in which case the region of influence is prevented from entering the prohibited zone and the displayed objects located within the region of influence continue to move according to the received input.

2. A method as claimed in claim 1, wherein the user input indirectly results in movement of the displayed object.

3. A method as claimed in claim 1, wherein the user input causes the region of influence of the interface element to be redefined within the display area which results in interaction of the interface element with the displayed object.

4. A method as claimed in claim 3, wherein redefining the region of influence of the interface element is in the form of moving the region of influence within the display area.

5. A method as claimed in claim 3, wherein redefining the region of influence of the interface element is in the form of resizing the region of influence within the display area.

6. A method as claimed in claim 1, wherein the user input signifies activation of a manipulation property of the interface element which results in interaction of the interface element with the displayed object.

7. A method as claimed in claim 1, wherein the proximity is calculated in a radial direction from the centre of the region of influence.

8. A method as claimed in claim 7, wherein the size of an object is reduced as the object approaches the centre of the region of influence.

9. A method as claimed in claim 7, wherein the size of an object is altered in proportion to the distance between the object and the centre of the region of influence.

10. A method as claimed in claim 1, wherein the method comprises manipulating a plurality of displayed objects according to the nature of the input received.

11. A method as claimed in claim 1, wherein the manipulation further comprises varying the size of all displayed objects which overlap with the region of influence.

12. A method as claimed in claim 1, wherein the manipulation further comprises causing all displayed objects in the region of influence to move towards the centre of the region of influence when the user input signifies activation of an influence property of the interface element.

13. A method as claimed in claim 1, wherein the manipulation further comprises causing all displayed objects in the display area to move towards the centre of the region of influence when the user input signifies activation of a manipulation property of the interface element.

14. A method as claimed in claim 1, wherein the manipulation further comprises causing displayed objects having a selected property to move towards the centre of the region of influence when the user input signifies activation of a manipulation property of the interface element.

15. A method as claimed in claim 1, wherein the manipulation further comprises causing displayed objects that reach the centre of the region of influence to be hidden.

16. A method as claimed in claim 1, wherein the manipulation further comprises causing all displayed objects within the region of influence to move away from the centre of the region of influence when the received input signifies activation of a manipulation property of the interface element.

17. A method as claimed in claim 1, wherein the manipulation further comprises causing all displayed objects in the display area to move away from the centre of the region of influence when the received input signifies activation of a manipulation property of the interface element.

18. A method as claimed in claim 1, wherein the manipulation further comprises causing displayed objects having a selected property to move away from the centre of the region of influence when the received input signifies activation of a manipulation property of the interface element.

19. A method as claimed in claim 1, wherein the manipulation further comprises causing displayed objects within the region of influence to be deleted when the received input signifies activation of a manipulation property of the interface element.

20. A method as claimed in claim 1, wherein the manipulation further comprises causing displayed objects within the region of influence to be resized when the received input signifies resizing of the interface element, the objects bring resized in proportion to the size of the region of influence of the interface element.

21. A method as claimed in claim 1, wherein the manipulation further comprises causing hidden displayed objects within the region of influence to be shown when the received input signifies activation of a manipulation property of the interface element.

22. A method as claimed in claim 1, wherein the interface element displayed by the computing interface is generally coterminous with the corresponding region of influence.

23. A non-transitory computer readable storage medium storing a computer program for manipulating objects on a computing interface, said computer program comprising instructions that when executed by a computer cause the computer to:
   display a movable interface element that defines a region of influence within a display area of the computing interface, the interface element altering the size of displayed objects within the region of influence based on proximity to a designated centre of the region of influence,
   receive a user input which causes the interface element to move within the display area and alter the position of the centre of the region of influence relative to a displayed object; and
   manipulate the size of the displayed object when the received input results in an overlap between the displayed object and the region of influence, wherein the manipulation further comprises moving all displayed objects located within the region of influence along with the region of influence when the interface element is moved, unless the region of influence encounters a prohibited zone of the display area, in which case the region of influence is prevented from entering the prohibited zone and the displayed objects located within the region of influence continue to move according to the received input.

24. An apparatus for manipulating objects on a computing interface, said apparatus comprising:
   a display having a display area;
   a user input module;
   a processor configured to:
      display a movable interface element that defines a region of influence within a display area of the computing interface, the interface element altering the size of displayed objects within the region of influence based on proximity to a designated centre of the region of influence,
      receive a user input which causes the interface element to move within the display area of the computing interface and alter the position of the centre of the region of influence relative to a displayed object; and
      manipulate the size of the displayed object when the received input results in an overlap between the displayed object and the region of influence associated with the interface element,
      wherein the manipulation further comprises moving all displayed objects located within the region of influence along with the region of influence when the interface element is moved, unless the region of influence encounters a prohibited zone of the display area of the computing interface, in which case the region of influence is prevented from entering the prohibited zone and the displayed objects located within the region of influence continue to move according to the received input.

25. A non-transitory computer readable storage medium storing a computer program that defines an interface element for a computing interface, said element comprising:
   an interaction module for designating, as interface element input, certain user input that causes the interface element to move within a display area and overlap with a displayed object; and
   a manipulation module for manipulating displayed objects when an interface element input is received, wherein the manipulation module is configured to vary the size of the displayed objects based on a distance between the corresponding displayed object and a designated centre of the interface element when the interface element input is received,
   the manipulation module being further configured to move all displayed objects located within the region of influence along with the region of influence when the interface element is moved, unless the region of influence encounters a prohibited zone of the display area, in which case the region of influence is prevented from entering the prohibited zone and the displayed objects located within the region of influence continue to move according to a received input to move the interface element.

26. A method of manipulating a displayed object capable of interacting with an interface element of a computing interface, the computing interface having a display module for displaying the displayed object in a display area, and an input module for receiving user input, said method comprising:
   receiving a user input which causes the displayed object to interact with the interface element; and
   manipulating the displayed object according to the nature of the input received, wherein the manipulation comprises varying the size of the displayed object when the received input results in movement of the displayed object into, out of, or through a region of the display area designated as belonging to the interface element, and wherein the manipulation further comprises moving all displayed objects located within the region along with the region when the region is moved, unless the region encounters a prohibited zone of the display area, in which case the region is prevented from entering the prohibited zone and the displayed objects continue to move according to the received input.

27. An apparatus for manipulating a displayed object capable of interacting with an interface element of a computing interface, said apparatus comprising:
- a display having a display area;
- a user input module;
- a processor configured to:
    - receiving a user input which causes the displayed object to interact with the interface element;
    - manipulating the displayed object according to the nature of the input received, wherein the manipulation comprises varying the size of the displayed object when the received input results in movement of the displayed object into, out of, or through a region of the display area designated as belonging to the interface element, and wherein the manipulation further comprises moving all displayed objects located within the region along with the region when the region is moved, unless the region encounters a prohibited zone of the display area, in which case the region is prevented from entering the prohibited zone and the displayed objects continue to move according to the received input.

* * * * *